US009354838B2

(12) United States Patent
Fernahl et al.

(10) Patent No.: US 9,354,838 B2
(45) Date of Patent: May 31, 2016

(54) METHOD, MOBILE DEVICE AND INFOTAINMENT SYSTEM FOR PROJECTING A USER INTERFACE ONTO A SCREEN

(71) Applicant: Volkswagen Aktiengesellschaft, Wolfsburg (DE)

(72) Inventors: Dennis Fernahl, Berlin (DE); Mark Beckmann, Braunschweig (DE); Christopher Seubert, Berlin (DE); Volker Remuss, Berlin (DE)

(73) Assignee: Volkswagen Aktiengesesllschaft, Wolfsburg (DE)

( * ) Notice: Subject to any disclaimer, the term of this patent is extended or adjusted under 35 U.S.C. 154(b) by 37 days.

(21) Appl. No.: 14/486,264

(22) Filed: Sep. 15, 2014

(65) Prior Publication Data
US 2015/0002370 A1 Jan. 1, 2015

Related U.S. Application Data

(63) Continuation of application No. PCT/EP2013/055239, filed on Mar. 14, 2013.

(30) Foreign Application Priority Data

Mar. 15, 2012 (DE) .......................... 10 2012 005 054

(51) Int. Cl.
*G06F 3/14* (2006.01)
*G06T 3/40* (2006.01)
*G09G 5/12* (2006.01)

(52) U.S. Cl.
CPC ............ *G06F 3/1423* (2013.01); *G06F 3/1438* (2013.01); *G06F 3/1454* (2013.01);

(Continued)

(58) Field of Classification Search
CPC ... G06F 3/1438; G06F 3/1454; G09G 3/1454; G09G 2340/0407; G09G 2340/145; G09G 2370/04
USPC .......................................................... 345/1.1
See application file for complete search history.

(56) References Cited

U.S. PATENT DOCUMENTS 6,366,287 B1 4/2002 Van Vugt
6,611,358 B1 * 8/2003 Narayanaswamy .......... 358/442

(Continued)

FOREIGN PATENT DOCUMENTS

EP 1 821 483 A1 8/2007
EP 1 953 501 A2 8/2008

(Continued)

*Primary Examiner* — Ariel Balaoing
(74) *Attorney, Agent, or Firm* — Muncy, Geissler, Olds & Lowe, P.C.

(57) ABSTRACT

A method for projecting a user interface of an application program provided for a screen of a mobile device is provided onto a screen of an infotainment system arranged in a vehicle. The user interface can be displayed in a manner suitable for the driver of the vehicle if the screen size of the infotainment system is determined in the infotainment system. The screen size is transferred to the mobile device via a data interface, the user interface size of the application program running in the mobile device in the unit of the comparable size is determined in the mobile device. The screen size of the infotainment system is compared with the user interface size of the application program and a decision is made on the basis of the comparison, which image data is transferred from the mobile device to the infotainment system via the data interface.

9 Claims, 3 Drawing Sheets

(52) U.S. Cl.
CPC ............ *G06T3/4092* (2013.01); *G09G 5/12* (2013.01); *G06T 2200/16* (2013.01); *G06T 2200/24* (2013.01); *G09G 2340/0407* (2013.01); *G09G 2340/145* (2013.01); *G09G 2370/04* (2013.01); *G09G 2380/10* (2013.01)

(56) References Cited

U.S. PATENT DOCUMENTS

| 2008/0136819 | A1* | 6/2008 | Shivas et al. ............... 345/428 |
|---|---|---|---|
| 2008/0226182 | A1* | 9/2008 | Ichieda ........................ 382/232 |
| 2009/0322803 | A1 | 12/2009 | Nedeljkovic et al. |
| 2011/0128446 | A1 | 6/2011 | Woo |
| 2011/0314093 | A1 | 12/2011 | Sheu et al. |

FOREIGN PATENT DOCUMENTS

| EP | 0 916 130 B1 | 4/2009 |
|---|---|---|
| WO | WO 2008/077058 A1 | 6/2008 |

* cited by examiner

METHOD, MOBILE DEVICE AND INFOTAINMENT SYSTEM FOR PROJECTING A USER INTERFACE ONTO A SCREEN

This nonprovisional application is a continuation of International Application No. PCT/EP2013/055239, which was filed on Mar. 14, 2013, and which claims priority to German Patent Application No. 10 2012 005 054.2, which was filed in Germany on Mar. 15, 2012, and which are both herein incorporated by reference.

BACKGROUND OF THE INVENTION

1. Field of the Invention

The invention relates to a method for projecting a user interface, provided for a screen of a mobile device, of an application program, running in the mobile device, onto a screen of an infotainment system disposed in a vehicle.

The invention relates further to a mobile device having a screen, an interface unit, and an application program displaying a user interface on the screen, whereby the mobile device is designed to work together with an infotainment system, installed in a vehicle and having a screen, such that a data interface between the mobile device and the infotainment system is formed via the interface unit.

The invention relates, moreover, to an infotainment system having a screen and an interface unit, whereby the infotainment system is designed to work together with a mobile device, which has a screen and in which an application program displaying a user interface on the screen of the mobile device runs, such that a data interface between the mobile device and the infotainment system is formed via the interface unit.

DESCRIPTION OF THE BACKGROUND ART

It is prior in the art to integrate an application program (also called an application) of a mobile device into an infotainment system of a vehicle. To this end, the screen content of the mobile device is transmitted via a data interface to the infotainment system screen installed in the vehicle. The technology MirrorLink™ from the Car Connectivity Consortium, Beaverton, USA, for example, is suitable for the transmission.

The appearance of a user interface of an application program varies according to the optical properties of the selected screen. These properties include, for example, the screen's resolution and pixel density. The resolution can be expressed by the number of pixels horizontally (horizontal resolution) and vertically (vertical resolution). In this case, a pixel is understood to be a surface element of the screen necessary for displaying a color value. A pixel can be made up of a plurality of monochromatic image points, for example, from a red, green, and blue image point, in order to be able to display any color values. The pixel density can be expressed by the number of pixels per inch horizontally (horizontal pixel density) and vertically (vertical pixel density). The screen size can be expressed by the (visible) horizontal length and the (visible) vertical length of the screen.

The different appearances of the user interface of the application program pose difficulties for the application program developer, if the application program is to be suitable for different screens. The developer must take into account the different optical properties of the screens to avoid undesirable distortions, for example. Allowing the developer to work with a virtual pixel, namely, the density-independent pixel, is a known approach for freeing him from the specific optical properties of the different screens. The developer programs the user interface of the application program in units of these virtual pixels and leaves it to the screens to display the user interface correctly.

The introduction of density-independent pixels, however, does not assure that the screen content of a mobile device is displayed on the screen of the infotainment system in a manner suitable for the driver of a vehicle.

SUMMARY OF THE INVENTION

It is therefore an object of the invention to provide a method to assure a display suitable for a driver of a vehicle of a user interface of an application program, running in the mobile device, on a screen of an infotainment system disposed in the vehicle. The invention further has an object of providing a mobile device and an infotainment system with which the method of the invention can be carried out.

The object is achieved in an embodiment according to the invention with a method in that the screen size of the infotainment system in the unit of comparable size is determined in the infotainment system, the screen size of the infotainment system is transmitted via a data interface to the mobile device, the user interface size of the application program, running in the mobile device, in the unit of comparable size is determined in the mobile device, the screen size of the infotainment system is compared with the user interface size of the application program running in the mobile device, and depending on the comparison, a decision is made in the mobile device whether and, if so, which image data concerning the user interface are transmitted from the mobile device via the data interface to the infotainment system.

The comparable size is used uniformly in both the mobile device and the infotainment system to express the size of the user interface (user interface size) or the screen (screen size) of the infotainment system and to use this for the comparison. Thus, independent of the mobile devices and infotainment systems used in the specific case, it can be assured in a simple way that the projection of the display of the mobile device onto the screen of the infotainment system of the vehicle will be of a sufficient size to be read and operated easily by the driver. In addition, the programmer of the application program is unburdened, because he does not need to be concerned about the devices in which his application program will run. He specifies only one size in the unit of comparable size, which the screen of the device to be employed should have. A further advantage of the method of the invention is that the application program can be tested with a simple test setup as to whether it responds correctly if the screen size is smaller than the necessary screen size.

The image data, completely representing the user interface, are preferably transmitted from the mobile device via the data interface to the infotainment system, if the comparison shows that the screen size of the infotainment system is not smaller than the user interface size of the application program running in the mobile device. Thus, the user interface can be displayed on the screen of the infotainment system without content-based limitations and is available to the driver.

In an embodiment, the image data, modifying the user interface, are transmitted from the mobile device via the data interface to the infotainment system, if the comparison shows that the screen size of the infotainment system is smaller than the user interface size of the application program, running in the mobile device, and the application program has available a modified user interface for the screen size of the infotainment system. The availability of modifying image data can prevent the situation that the user interface is displayed either not at all or in insufficient quality on the infotainment system screen. The programmer of the application program expediently takes into account even during the programming the different layout classes in that he makes available a suitable user interface for each layout class. A layout class in this case represents screens whose optical features fall within certain intervals. Therefore, a variety of different screens is not considered or taken into account, but only a rough classification is made. Thus, a first layout class can be provided, for example, for smartphones, a second layout class for tablet PCs, and a third layout class for infotainment systems, so that the programmer makes available three different versions for a user interface of the application program. The assignment of a screen to a layout class occurs expediently via the size of the screen in the unit of comparable size.

In an embodiment no image data concerning the user interface are transmitted via the data interface to the infotainment system, if the comparison shows that the screen size of the infotainment system is smaller than the user interface size of the application program, running in the mobile device, and the application program does not have a modified user interface available for the screen size of the infotainment system. This prevents the distraction of the driver from traffic by a distorted or poorly readable screen content.

Moreover, the object is achieved according to an embodiment of the invention with a mobile device of the aforementioned type in that the mobile device is designed to receive via the data interface from the infotainment system the screen size of the infotainment system in the unit of comparable size, to determine the user interface size of the application program, running in the mobile device, in the unit of comparable size in the mobile device, to compare the screen size of the infotainment system with the user interface size of the application program running in the mobile device, and depending on the comparison, to decide whether and, if so, which image data concerning the user interface are transmitted from the mobile device via the data interface to the infotainment system.

The advantages of the mobile device of the invention emerge from the aforementioned advantages of the method of the invention, because the mobile device is designed to work together with a suitable infotainment system so that they can carry out the method of the invention.

In order to display the user interface without content-based limitations on the screen of the infotainment system and to make it available to the driver, the mobile device is expediently designed to transmit the image data, completely representing the user interface, from the mobile device via the data interface to the infotainment system, when the comparison shows that the screen size of the infotainment system is not smaller than the user interface size of the application program running in the mobile device.

Advantageously, the mobile device is designed to transmit the image data, modifying the user interface, from the mobile device via the data interface to the infotainment system, if the comparison shows that the screen size of the infotainment system is smaller than the user interface size of the application program running in the mobile device, and the application program has a modified user interface available for the screen size of the infotainment system. The availability of modifying image data can prevent the situation that the user interface is displayed either not at all or in insufficient quality on the infotainment system screen.

In order to prevent the driver from being distracted from traffic by a distorted or poorly readable screen content, in an advantageous embodiment the mobile device is designed not to transmit any image data concerning the user interface via the data interface to the infotainment system, if the comparison shows that the infotainment system screen size is smaller than the user interface size of the application program running in the mobile device, and the application program does not have a modified user interface available for the infotainment system screen size.

The object is achieved further according to an embodiment of the invention with an infotainment system of the aforementioned type in that the infotainment system is designed to determine the infotainment system screen size in the unit of comparable size and to transmit this via the data interface to the mobile device and to receive image data provided by the mobile device and concerning the user interface via the data interface.

The advantages of the infotainment system of the invention emerge from the aforementioned advantages of the method of the invention, because the infotainment system is designed to work together with the mobile device of the invention such that they can carry out the method of the invention.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
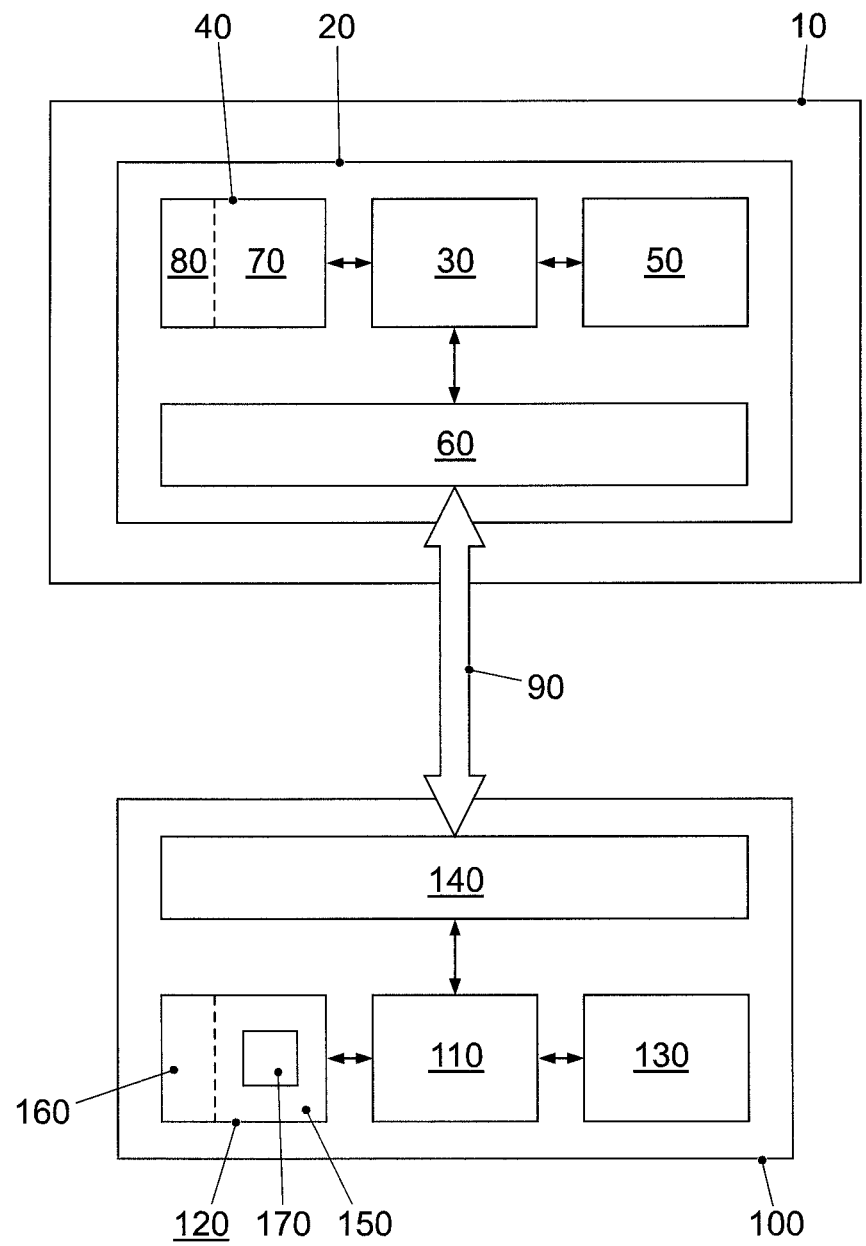
FIG. 1 shows a schematic arrangement of a mobile device of the invention and of an infotainment system of the invention.

FIG. 1 shows an infotainment system 20 installed in the center console of a vehicle 10. Infotainment system 20 is a network of a plurality of devices that provide the driver with various information and/or functions. Such devices include, for example: a radio, CD (compact disc), DVD (digital versatile disc), telephone, navigation device, and traffic telematics device.

Infotainment system 20 has a control unit 30, a memory unit 40, a screen 50, and an interface unit 60.

Memory unit 40 in the present exemplary embodiment can include an internal memory 70, permanently integrated into infotainment system 20, and an optional external memory 80. The optional external memory 80 can be, for example, an SD card (SD: secure digital) that can be inserted in a suitable slot or a USB stick (USB: universal serial bus).

The size of screen 50 in the unit of comparable size is stored in memory unit 40. In the present case, the comparable size is defined as: one by a hundred of an arbitrary length unit (LE) in the horizontal direction, and one by a hundred of the arbitrary length unit in the vertical direction. In other words, there are 100 virtual pixels per length unit in both the horizontal and vertical direction. A centimeter can be selected, for example, as the arbitrary length unit.

Screen 50 (also see FIG. 3) has a resolution of 800 real pixels in the horizontal direction and 400 real pixels in the vertical direction. The horizontal dimension (width) constitutes two length units and the vertical dimension (height) one length unit. This results in a pixel density of 400 pixels per length unit both in the horizontal and vertical direction. For the size of screen 50 in the unit of comparable size, this comes down to only the width and height of screen 50. The size in the unit of comparable size, i.e. device independent pixel, therefore is 200 units in the horizontal direction and 100 in the vertical direction, or stated differently: (200×100).

A device independent pixel is a physical unit of measurement based on a co-ordinate system held by a computer and represents an abstraction of a pixel for use by an application that an underlying system then converts to physical pixels.

A data interface 90 for exchanging data to external devices, for example, to a mobile device 100, is made via interface unit 60. Data interface 90 in the present case is designed so that it supports the standard MirrorLink™.

Control unit 30 can exchange data bidirectionally with memory unit 40. Control unit 30 reads from memory unit 40, for example, the size of screen 50 in the unit of comparable size.

Control unit 30 can exchange data bidirectionally with screen 50. For example, control unit 30 sends image data to screen 50, which thereupon displays a screen content corresponding to the image data. Screen 50 is made as a touchscreen, so that the user can input control commands into infotainment system 20 by touching the screen surface. These control commands are then transmitted to control unit 30.

Control unit 30 can exchange data bidirectionally with interface unit 60. For example, control unit 30 sends the size of screen 50 in the unit of comparable size via interface unit 60 and data interface 90 to mobile device 100.

Mobile device 100 has a control unit 110, a memory unit 120, a screen 130, and an interface unit 140.

Memory unit 120 in the present exemplary embodiment has an internal memory 150, permanently integrated into mobile device 100, and an optional external memory 160.

The program code of an application program 170 is stored in memory unit 120, in the present case in internal memory 150.

Screen 130 (also see FIG. 3) has, for example, a resolution of 1000 real pixels in the horizontal direction and 2000 real pixels in the vertical direction. The horizontal dimension (width) constitutes one length unit, and the vertical dimension (height) also one length unit. This results in a pixel density of 1000 pixels per length unit in the horizontal direction and 2000 pixels per length unit in the vertical direction. The real pixels therefore are much closer together than in screen 50 of infotainment system 20. For the size of screen 130 in the unit of comparable size, this comes down to only the width and height of screen 130 here as well. The size in the unit of comparable size therefore is 100 units in the horizontal direction and 100 units in the vertical direction, or stated differently: (100×100).

Data interface 90 for exchanging data to infotainment system 20 is set up via interface unit 140. Of course, data interfaces to other devices can also be set up via interface unit 140. Only data interface 90 is of interest in the present case, however.

Control unit 110 can exchange data bidirectionally with memory unit 120. Control unit 110 reads from memory unit 120, for example, application program 170 in order to execute it.

Control unit 110 can exchange data bidirectionally with screen 130. For example, control unit 110 sends image data to screen 130, which thereupon displays a screen content corresponding to the image data, for example, a user interface of application program 170. Screen 130 is also made as a touchscreen, so that the user can transmit control commands to mobile device 100 by touching the screen surface. These control commands are then transmitted to control unit 110.

Control unit 110 can exchange data bidirectionally with interface unit 140. For example, control unit 110 receives the size of screen 50 of infotainment system 20 in the unit of comparable size via data interface 90 and interface unit 140 from infotainment system 20. In addition, control unit 110 can send data, for example, the image data concerning the user interface, via interface unit 140 and data interface 90 to infotainment system 20.

A comparison of the size of screen 130 (or the user interface) with the size of screen 50 of infotainment system 20 is carried out in control unit 110 of mobile device 100 and the decision is made whether and, if so, which image data are sent to infotainment system 20.

Figure 2:
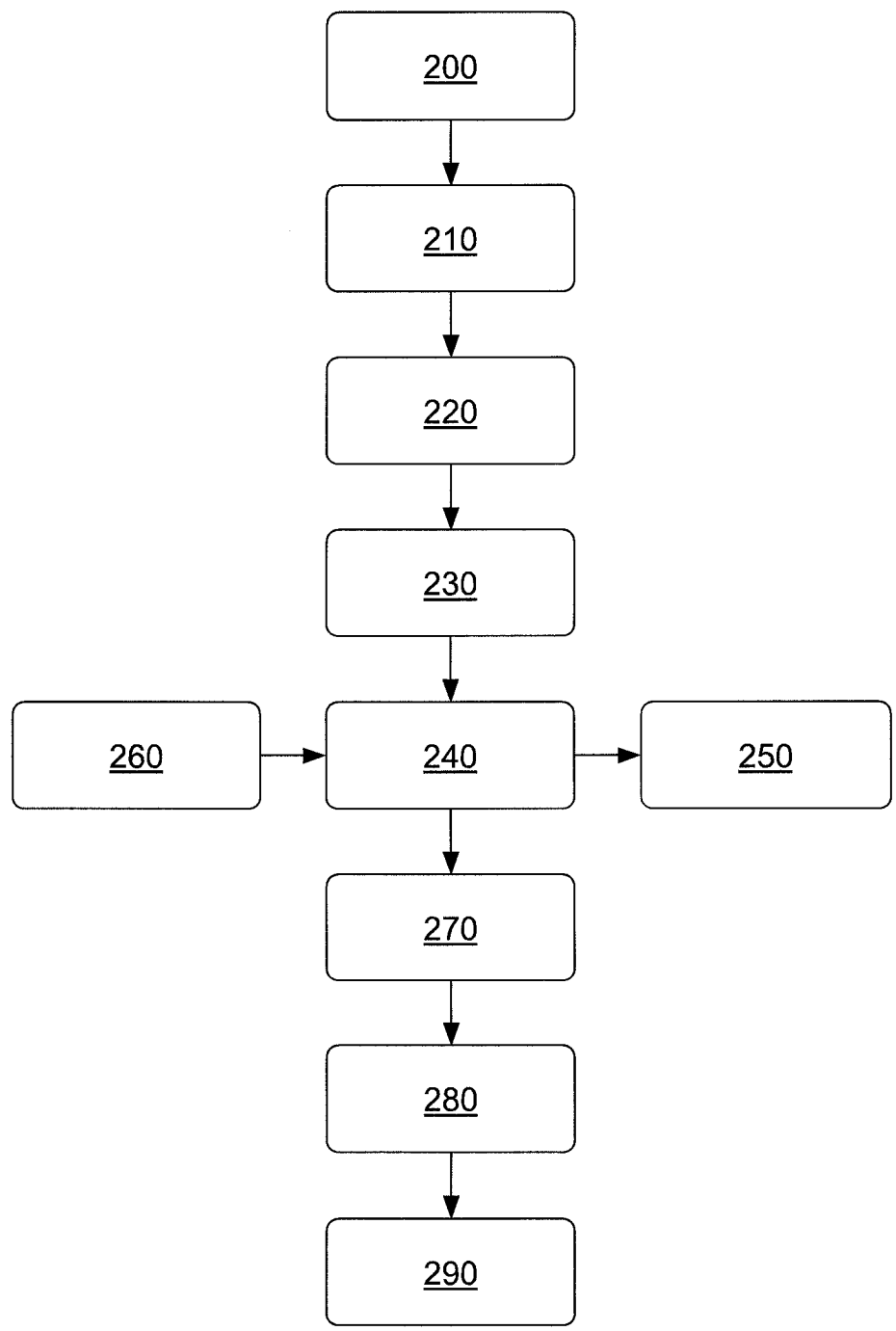
FIG. 2 shows a flowchart of the method of the invention.

The method of the invention will be described in greater detail with use of FIG. 2.

In a step 200, control unit 30 of infotainment system 20 determines the size of screen 50 of infotainment system 20 in the unit of comparable size.

In a step 210, control unit 30 transmits the size of screen 50 of infotainment system 20 in the unit of comparable size via interface unit 60 and data interface 90 to mobile device 100.

In a step 220, control unit 110 of mobile device 100 determines the user interface size of application program 170 running in mobile device 100 in the unit of comparable size. This occurs expediently in such a way that application program 170 has available the user interface size in the unit of comparable size and provides this to control unit 110, for example, after control unit 110 has sent a request signal to application program 170.

In a step 230, control unit 110 compares the size of screen 50 of infotainment system 20 in the unit of comparable size with the user interface size of application program 170 in the unit of comparable size. The comparison result is thereupon evaluated in a step 240.

In step 240, control unit 110 decides whether and, if so, which image data, concerning the user interface, are transmitted by mobile device 100 via data interface 90 to infotainment system 20.

If the comparison shows that the screen size of infotainment system 20 is smaller than the user interface size of application program 170, running in mobile device 100, and the application program does not have any modified user interface available for the screen size of infotainment system 20, the method ends in a step 250. Expediently, control unit 110 sends a communication to control unit 30 of infotainment system 20 that no image data are transmitted for this application program 170. Then, control unit 30 can control screen 50 such that the user, particularly the driver, is informed that application program 170 is not available in infotainment system 20 or the user interface of application program 170 is not available on screen 50 of infotainment system 20.

If the comparison shows that the screen size of infotainment system 20 is smaller than the user interface size of application program 170 running in mobile device 100, and application program 170 has a modified user interface available for the screen size of infotainment system 20, then control unit 110 transmits image data modifying the user interface, which control unit 110 receives in a step 260 from application program 170, from mobile device 100 via data interface 90 to infotainment system 20. The image data of the modified user interface are stored in application program 170 in a layout class. Application program 170 can also have a number of layout classes available.

In a step 270, the image data are transmitted from mobile device 100 via data interface 90 to infotainment system 20.

In a step 280, the image data are sent from control unit 30 to screen 50, whereby the image data are converted optionally into suitable control signals in control unit 30.

In a step 290, a screen content, which is displayed on screen 50, is generated from the image data or the control signals.

Figure 3:
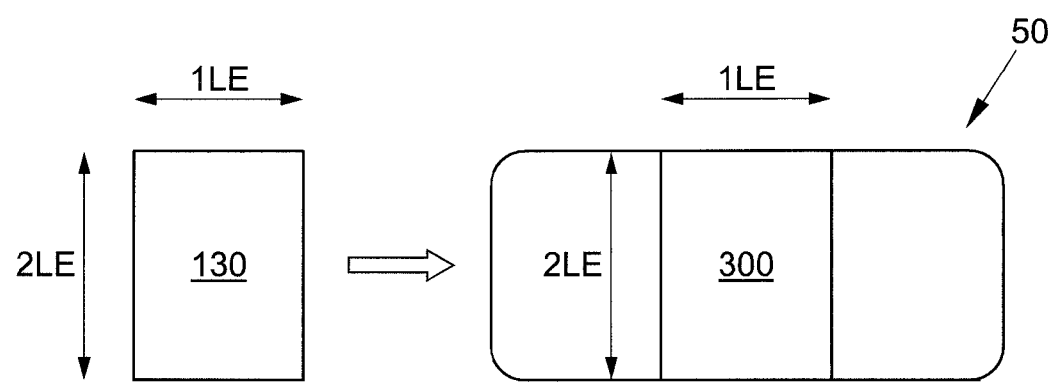
FIG. 3 shows a schematic arrangement of the screens of the mobile device and infotainment system of FIG. 1.

FIG. 3 shows screen 130 of the mobile device and screen 50 of infotainment system 20.

Screen 130 of the mobile device in the present exemplary embodiment corresponds to the user interface of application program 170. However, the user interface can also be larger or smaller than screen 130.

The comparison in the unit of comparable size shows here (see the description to FIG. 1) that the user interface size (100×100) is not greater than the screen size (200×200) of screen 50, because the condition "not greater than" is met both for the widths (100<200) and for the heights (100=100). Thereby, the user interface of the application program can be displayed completely on screen 50 of infotainment system 20 as image 300, although the resolution and pixel density of screen 130 of mobile device 100 are greater than the resolution and pixel density of screen 50 of infotainment system 20.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for projecting a user interface of an application program provided for a screen of a mobile device, the application program running in the mobile device, onto a screen of an infotainment system arranged in a vehicle,
    determining, in the infotainment system, a first device independent pixel size representing a screen size of the infotainment system;
    transmitting the first device independent pixel size representing the screen size of the infotainment system via a data interface to the mobile device,
    determining, in the mobile device, a second device independent pixel size representing a user interface size of the application program running in the mobile device;
    comparing the first device independent pixel size representing the screen size of the infotainment system with the second device independent pixel size representing the user interface size of the application program running in the mobile device; and
    determining in the mobile device, based on the comparison, whether and, if so, which image data concerning the user interface are transmitted from the mobile device via the data interface to the infotainment system,
    wherein image data including a modified user interface are transmitted from the mobile device via the data interface to the infotainment system, if the comparison shows that the first device independent pixel size representing the screen size of the infotainment system is smaller than the second device independent pixel size representing the user interface size of the application program running in the mobile device, and the application program has a modified user interface available for the screen size of the infotainment system, and
    wherein at least two modified user interfaces are available, each of the at least two modified user interfaces corresponding to a respective layout class stored in an application program in the mobile device.

2. The method according to claim 1, wherein the image data completely representing the user interface are transmitted from the mobile device via the data interface to the infotainment system, if the comparison shows that the first device independent pixel size representing the screen size of the infotainment system is not smaller than the second device independent pixel size representing the user interface size of the application program running in the mobile device.

3. The method according to claim 1, wherein no image data concerning the user interface are transmitted via the data interface to the infotainment system, if the comparison shows that the first device independent pixel size representing the screen size of the infotainment system is smaller than the second device independent pixel size representing the user interface size of the application program running in the mobile device, and the application program does not have a modified user interface available for the screen size of the infotainment system.

4. A mobile device comprising:
    a screen;
    an interface unit; and
    an application program displaying a user interface on the screen,
    wherein the mobile device is adapted to work together with an infotainment system installed in a vehicle and having a screen, such that a data interface between the mobile device and the infotainment system is formed via the interface unit,
    wherein the mobile device receives, via the data interface, from the infotainment system a first device independent pixel size representing the screen size of the infotainment system,
    wherein the mobile device determines a second device independent pixel size representing the user interface size of the application program running in the mobile device,
    wherein the mobile device compares the first device independent pixel size representing the screen size of the infotainment system with the second device independent pixel size representing the user interface size of the application program running in the mobile device,
    wherein, based on the comparison, the mobile device decides whether and, if so, which image data concerning the user interface are transmitted from the mobile device via the data interface to the infotainment system, and
    wherein the mobile device transmits the image data including a modified user interface from the mobile device via the data interface to the infotainment system, if the comparison shows that the first device independent pixel size representing the screen size of the infotainment system is smaller than the second device independent pixel size representing the user interface size of the application program running in the mobile device and the application program has a modified user interface available for the screen size of the infotainment system, and
    wherein at least two modified user interfaces are available, each of the at least two modified user interfaces corresponding to a respective layout class stored in an application program in the mobile device.

5. The mobile device according to claim 4, wherein the mobile device transmits image data completely representing the user interface from the mobile device via the data interface to the infotainment system, if the comparison shows that the first device independent pixel size representing the screen size of the infotainment system is not smaller than the second device independent pixel size representing the user interface size of the application program running in the mobile device.

6. The mobile device according to claim 4, wherein the mobile device does not transmit any image data relating to the user interface via the data interface to the infotainment system, if the comparison shows that the first device independent pixel size representing the screen size of the infotainment system is smaller than the second device independent pixel size representing the user interface size of the application program running in the mobile device and the application program does not have a modified user interface available for the screen size of the infotainment system.

7. An infotainment system comprising:
a screen; and
an interface unit,
wherein the infotainment system is adapted to work together with a mobile device having a screen, the mobile device having an application program running thereon that displays a user interface on the screen of the mobile device so that a data interface between the mobile device and the infotainment system is formed via the interface unit,
wherein the infotainment system determines a first device independent pixel size representing the screen size of the infotainment system and transmits the first device independent pixel size to the mobile device via the data interface,
wherein the infotainment system receives, via the data interface, image data provided by the mobile device representing the user interface running on the mobile device, and
wherein the infotainment system receives the image data including a modified user interface from the mobile device via the data interface to the infotainment system, if the first device independent pixel size representing the screen size of the infotainment system is smaller than a second device independent pixel size representing the user interface size of the application program running in the mobile device and the application program has a modified user interface available for the screen size of the infotainment system, and
wherein at least two modified user interfaces are available, each of the at least two modified user interfaces corresponding to a respective layout class stored in an application program in the mobile device.

8. The method according to claim 1, wherein at least two layout classes are stored in the application program.

9. The mobile device according to claim 4, wherein at least two layout classes are stored in the application program.

* * * * *